(12) United States Patent
Mattlin et al.

(10) Patent No.: US 11,207,795 B1
(45) Date of Patent: Dec. 28, 2021

(54) MOLD MATERIALS FOR FORMED CERAMIC

(71) Applicant: Apple Inc., Cupertino, CA (US)

(72) Inventors: Jeffrey L. Mattlin, San Francisco, CA (US); Abhijeet Misra, Sunnyvale, CA (US); Herng-Jeng Jou, San Jose, CA (US); James A. Wright, Los Gatos, CA (US); James A. Yurko, Saratoga, CA (US); Lei Gao, Shanghai (CN); Weiming Huang, State College, PA (US); William A. Counts, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 413 days.

(21) Appl. No.: 16/137,434

(22) Filed: Sep. 20, 2018

Related U.S. Application Data (60) Provisional application No. 62/561,135, filed on Sep. 20, 2017.

(51) Int. Cl.
  *B28B 7/36* (2006.01)
  *B29C 43/32* (2006.01)

(52) U.S. Cl.
  CPC ............... *B28B 7/36* (2013.01); *B28B 7/364* (2013.01); *B29C 43/32* (2013.01)

(58) Field of Classification Search
  CPC .. B28B 3/00; B28B 3/025; B28B 3/04; B28B 3/086; B28B 7/00; B28B 7/0029; B28B 7/0097; B28B 7/36; B28B 7/364; C03B 11/00; C03B 11/06; C03B 11/005; C03B 11/05; C03B 11/08; C03B 11/086; C03B 11/084; C03B 11/122; B29C 43/00; B29C 43/02; B29C 43/32
  See application file for complete search history.

(56) References Cited

U.S. PATENT DOCUMENTS

| | | | | |
|---|---|---|---|---|
| 3,861,839 | A * | 1/1975 | Malik | B22F 3/00 425/78 |
| 6,363,747 | B1 * | 4/2002 | Budinski | C03B 11/08 65/102 |
| 6,514,444 | B1 * | 2/2003 | Kurita | B29C 33/38 264/219 |
| 2005/0138969 | A1 * | 6/2005 | Pai | C03B 11/086 65/374.11 |
| 2007/0087143 | A1 * | 4/2007 | Lin | C03B 11/08 65/286 |

* cited by examiner

*Primary Examiner* — Joseph S Del Sole
*Assistant Examiner* — Thu Khanh T Nguyen
(74) *Attorney, Agent, or Firm* — Morgan, Lewis & Bockius LLP (57) ABSTRACT

A mold apparatus to form a ceramic (or glass) includes a first mold portion having a first coefficient of thermal expansion and a second mold portion having a second coefficient of thermal expansion. In some embodiments, the first mold portion and/or the second mold portion are substantially immiscible with the ceramic material, such as silicon oxide, at a temperature greater than 600° C. In some embodiments, the first coefficient of thermal expansion and the second coefficient of thermal expansion are substantially similar to that of the glass or ceramic material. In some embodiments, the first coefficient of thermal expansion is different from the second coefficient of thermal expansion. In some embodiments, the first mold portion and the second mold portion contain a surface coating and a passivation layer.

17 Claims, 6 Drawing Sheets

MOLD MATERIALS FOR FORMED CERAMIC

CROSS-REFERENCE TO RELATED APPLICATIONS

This application claims the benefit of U.S. Provisional Application No. 62/561,135, entitled "IMPROVED MOLD MATERIALS FOR FORMED CERAMIC," filed Sep. 20, 2017, the entirety of each of which is incorporated herein by reference.

TECHNICAL FIELD

The present disclosure generally relates to material systems and methods of improved mold materials for formed ceramic.

BACKGROUND

Glass forming processes, in particular, aluminosilicate glass forming processes, occur at temperatures greater than 600° C., above the glass transition temperature ($T_g$) where the glass can homogeneously flow/shear without crystallization or fracture under induced pressure. In these processes, high temperature and pressure are generally applied by compressing the glass between two mold portions under a partial pressure of oxygen that limits the life (i.e., number of cycles to failure) of conventional mold materials. For example, various widely used mold materials, such as graphite, rapidly oxidize after limited cycles (e.g., less than 100), reducing the durability of the mold and causing glass defects such as sticking of the mold to the glass and transfer of mold particles into the glass surface. Some alloys and ceramics, including bulk oxides can also be made into molds but they also fail as mold materials at temperatures greater than 600° C. because the high temperature and pressure activate certain oxidation mechanisms causing interaction between the mold surface and the glass, resulting in glass defects and inadvertent transfer of mold materials to the glass.

BRIEF DESCRIPTION OF THE DRAWINGS

The present embodiments now will be discussed in detail with an emphasis on highlighting the advantageous features. These embodiments are for illustrative purposes only and are not to scale, instead emphasizing the principles of the disclosure. These drawings include the following figures, in which like numerals indicate like parts.

Like reference numerals refer to like elements throughout. Elements are not to scale unless otherwise noted.

DETAILED DESCRIPTION

The following description and examples illustrate some exemplary implementations, embodiments, and arrangements of the disclosed invention in detail. Those of skill in the art will recognize that there are numerous variations and modifications of this invention that are encompassed by its scope. Accordingly, the description of a certain example embodiment should not be deemed to limit the scope of the present invention. For example, the term "ceramic" can refer to glass and glass-ceramic materials that can be molded using a mold or mold surfaces as described herein, and therefore, hereinafter the general term "ceramic" is used to refer to all glass and glass-ceramic materials as described herein. Some examples of ceramic can include glass, Gorilla glass (e.g., 5318), aluminosilicate glass (e.g., halogen lamp, fiberglass), vitreous silica, boron oxide (boron trioxide), fused quartz, fused silica glass, soda lime glass, soda-alumina silicates, lead borates, soda-boria phosphates, lithia-aluminosilicates, transparent glasses, and classes of ceramics or ceramic materials. For example, a ceramic forming process can be applicable to glass forming or glass-ceramic forming, and ceramic defects can also refer to glass defects or glass-ceramic defects.

In accordance with various aspects of the subject disclosure, a number of new approaches have been developed as described herein to maximize mold life, reduce ceramic defects (induced via sticking/reaction), and/or enable scale-up of the ceramic forming process. For example, molds and/or mold surfaces as disclosed herein can be made from a mold material with a coefficient of thermal expansion substantially equal to the ceramic being molded. In some embodiments, the two mold portions of a mold can be made from the same materials so that they have the same physical properties, such as the same coefficient of thermal expansion (CTE). In other embodiments, the two mold portions of a mold can be made from different materials, but they may have similar physical properties, such as having substantially similar CTE. Alternatively, the two mold portions of a mold can be made from two different materials that have two different CTEs, which can be similar or different from the coefficient of thermal expansion of the ceramic material being molded.

In some embodiments, the coefficient of thermal expansion values for some examples of mold materials as described herein can range from about 0.1 μm/m/° C. to about 20 μm/m/° C. Some example CTE values of a mold material can be about 0.1 μm/m/° C., about 0.2 μm/m/° C., about 0.4 μm/m/° C., about 0.6 μm/m/° C., about 0.8 μm/m/° C., about 1.2 μm/m/° C., about 1.4 μm/m/° C., about 1.6 μm/m/° C., about 1.8 μm/m/° C., about 2.0 μm/m/° C., about 2.5 μm/m/° C., about 3.0 μm/m/° C., about 3.5 μm/m/° C., about 4.0 μm/m/° C., about 4.5 μm/m/° C., about 5.0 μm/m/° C., about 5.5 μm/m/° C., about 6.0 μm/m/° C., about 6.5 μm/m/° C., about 7.0 μm/m/° C., about 7.5 μm/m/° C., about 8.0 μm/m/° C., about 8.5 μm/m/° C., about 9.0 μm/m/° C., about 9.5 μm/m/° C., about 10 μm/m/° C., about 10.5 μm/m/° C., about 11.0 μm/m/° C., about 11.5 μm/m/° C., about 12.0 μm/m/° C., about 12.5 μm/m/° C., about 13.0 μm/m/° C., about 13.5 μm/m/° C., about 14.0 μm/m/° C., about 14.5 μm/m/° C., about 15.0 μm/m/° C., about 15.5 μm/m/° C., about 16.0 μm/m/° C., about 16.5 μm/m/° C., about 17.0 μm/m/° C., about 17.5 μm/m/° C., about 18.0 μm/m/° C., about 18.5 μm/m/° C., about 19.0 μm/m/° C., about 19.5 μm/m/° C., about 20.0 μm/m/° C., and inclusive of any CTE values therebetween.

According to some embodiments, molds and/or mold surfaces as disclosed herein comprise materials, including ceramic and oxide materials saturated with oxide at the surface so that the mold surfaces are substantially immiscible with silica ceramic (e.g., silica-glass) to reduce reaction between the mold and the ceramic. According to some embodiments, molds and/or mold surfaces as disclosed herein can comprise a coating and/or a passivation layer that help prevent further oxidation and/or ion exchange at the interface between the mold and the ceramic.

Figure 1A:
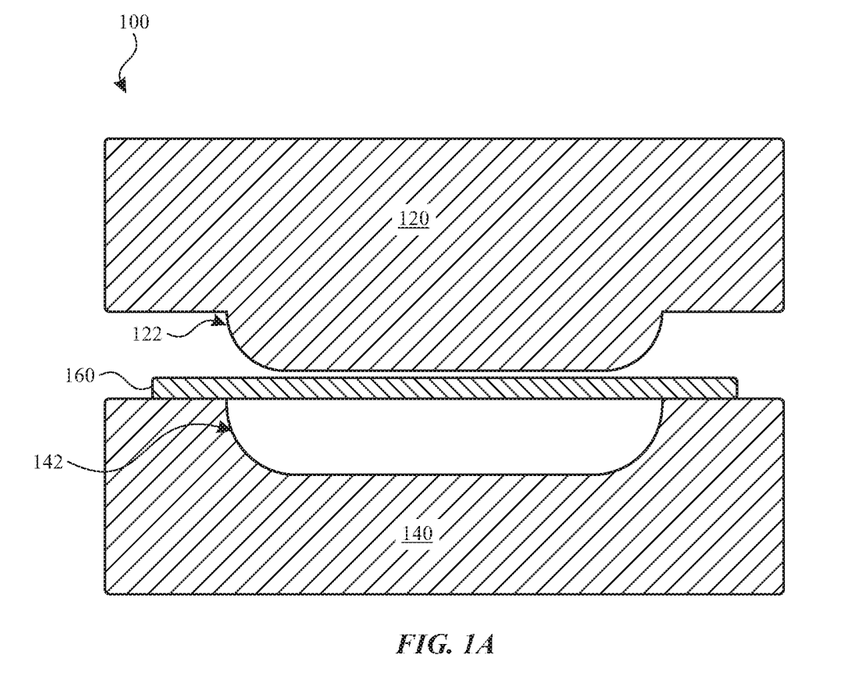
FIGS. 1A-1D illustrate schematic views of a mold having similar mold portions, according to some embodiments.

An example embodiment is illustrated in FIGS. 1A-1D as schematic views of a mold 100 to form a ceramic 460 having a particular geometry with curve features. As illustrated in FIG. 1A, the mold 100 having a first mold portion 120 and a second mold portion 140 can receive the ceramic 160 between the first mold portion 120 and the second mold portion 140. Each of the first mold portion 120 and the second mold portion 140 has curved mold portions 122 and 142, respectively, to form the ceramic 160 to have curve features 162. Although shown as two-dimensional curved mold portions, the curved mold portions 122 and 142 are not just limited to two-dimensional curvatures, and can therefore be applied as three-dimensional curved surface portions, for example, to form a ceramic 460 having three-dimensional curved features or complex surfaces.

Figure 1B:
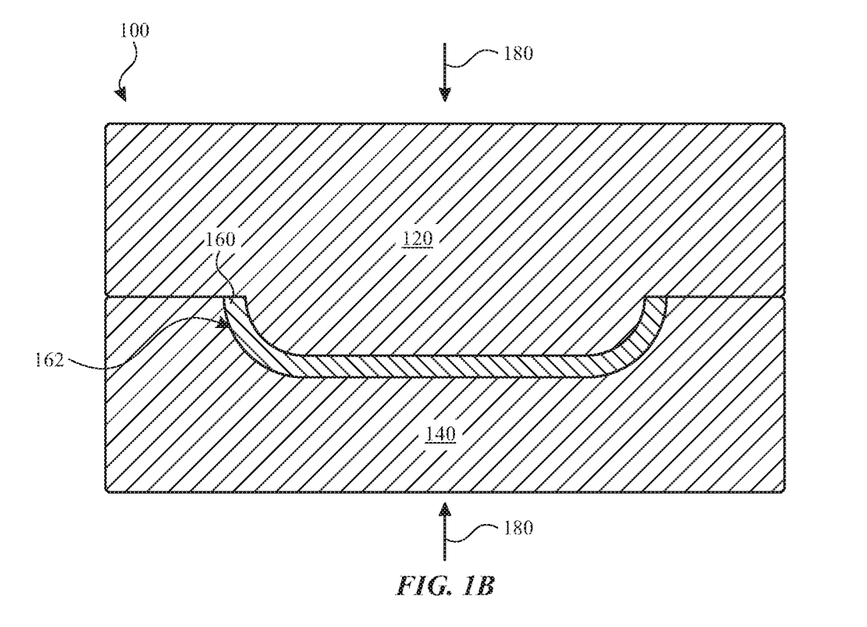
Figure 1C:
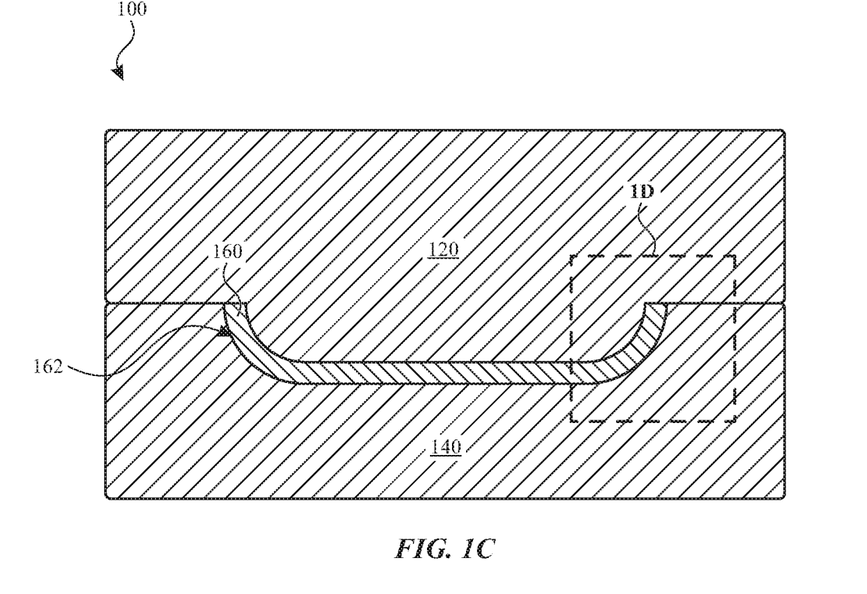
Figure 1D:
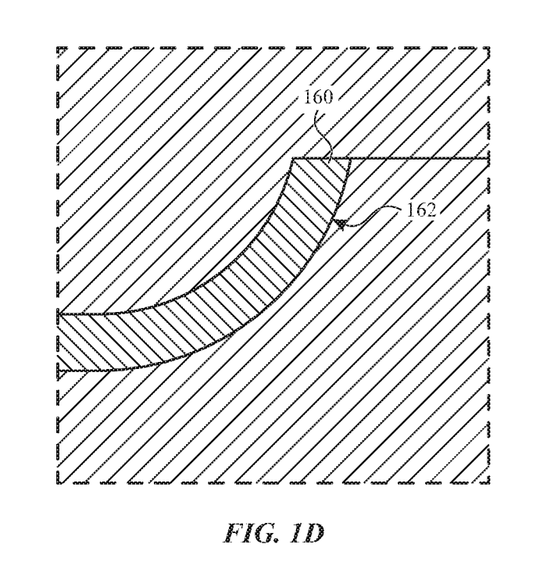

According to some embodiments, the first mold portion 120 and the second mold portion 140 are substantially immiscible with the ceramic 160. As illustrated in FIGS. 1B-1D, the ceramic 160 is molded by applying pressure 180 to the first mold portion 120 and the second mold portion 140 at an elevated temperature, for example, greater than 600° C. In some embodiments, the pressure 180 can range from 0 MPa, 0.1 MPa, 0.2 MPa, 0.3 MPa, 0.4 MPa, 0.5 MPa, 0.6 MPa, 0.7 MPa, 0.8 MPa, 0.9 MPa, and 1.0 MPa. According to some embodiments, the temperature can be about or greater than 700° C., 750° C., 800° C., 850° C., 900° C., 950° C. or 1000° C.

According to some embodiments, the first mold portion 120 and the second mold portion 140 have the same coefficient of thermal expansion as the ceramic 160. According to some embodiments, the first mold portion 120 and the second mold portion 140 have a difference in CTE values from the ceramic 160 of about 2%, about 4%, about 6%, about 8%, about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, or about 100%, inclusive of any CTE values therebetween.

According to some embodiments, the first mold portion 120 and the second mold portion 140 can be any of chromium oxide (Chromia $Cr_2O_3$ or generically $Cr_xO_y$), tantalum oxide ($Ta_2O_3$ or generically $Ta_xO_y$) and titanium bismuth compound ($TiB_2$), or any other materials listed as described herein with respect to the mold 100, the first mold portion 120 and the second mold portion 140. According to some embodiments, at least one of the first mold portion 120 and the second mold portion 140 is chromium oxide with at least 18 atomic percent of chromium.

The following passages describe additional non-limiting examples of material that can be used as molds or mold surfaces for the first mold portion 120 and the second mold portion 140. In some embodiments, the first mold portion 120 and the second mold portion 140 can be any of graphite, tool steel, stainless steel, refractory metal and alloys, super alloys and ceramics.

Some examples of graphite material include SGL R8710, Tokai HK-0, Tokai HK-1, Tokai HK-15, Tokai HK-2, Tokai HK-75, Tokai HK-3, Tokai HK-6, Tokai G250, Tokai G320, Tokai G330, Tokai G347, Tokai G348, Tokai G458, Tokai G520, Tokai G530, Tokai G535, Tokai G540, Tokai G077, Poco GF-XL-1, Poco GF-LT-1, Toyo IG-11, Toyo IG-12, Toyo IG-15, Toyo IG-19, Toyo IG-43, Toyo IG-45, Toyo IG-56, Toyo IG-70, Toyo ISEM-1, Toyo ISEM-2, Toyo ISEM-3, Toyo ISEM-8, Toyo ISO-63, Toyo ISO-66, Toyo ISO-68, Toyo TTK-4, Toyo TTK-5, Toyo TTK-8, Toyo TTK-9, Toyo SIC-6, Toyo SIC-12, Toyo HPG-51, Toyo HPG-53, Toyo HPG-59, Toyo HPG-81, Toyo HPG-83, Toyo HPG-530, Mersen Ellor DS4, Mersen Ellen +50, etc.

Some examples of tool steels include Daido, such as NAK 80, American Iron and Steel Institute (AISI), including P20, D2, H13, H21, H24, H26, or higher, M2. Examples of additional AISI material includes 309, 310, 316, 330 431, 18 SR, and 446, with a large group of AISI materials including 201, 202, 301, 302, 304, 308, 309, 310, 316, 317, 321, 330, 347, 405, 410, 416, 420, 430, 440, 442, and 446.

Some examples of refractory materials include graphite (including grade GF-XL-1), tungsten carbide (WC, including grade YG15C, CTU08L, FC25, Co5, Co15, Co25), Anviloy grade 1150, tungsten heavy alloys (WHA, including grade D185, D170), titanium zirconium molybdenum (TZM), Mo, Cr (including grade HP, UHP), chromium iron yttrium (CFY), etc.

Some examples of super alloy material include Alloy 230, Alloy 25, Inconel 22, Inconel C-276, Inconel G-3, Inconel 600, Inconel 601, Inconel 617, Inconel 625, Inconel 625LCF, Inconel 686, Inconel 690, Inconel 693, Inconel 706, Inconel 718, Inconel 725, Inconel 740, Inconel 740-H, Inconel X750, Inconel 751, Inconel 783, Inconel HX, Inconel N06230, Incoloy DS, Incoloy 20, Incoloy 28, Incoloy 25-6M0, Incoloy 26-6HN, Incoloy 27-7M0, Incoloy A-286, Incoloy 330, Incoloy 800, Incoloy 800H, Incoloy 803, Incoloy 825, Incoloy 864, Incoloy 865, Incoloy 890, Incoloy 903, Incoloy 907, Incoloy 909, Incoloy 925, Incoloy 945, Incotherm TD, Nimonic 75, Nimonic 80A, Nimonic 86, Nimonic 90, Nimonic 105, Nimonic 115, Nimonic 263, Nimonic 901, Nimonic PE11, Nimonic PE16, Nimonic PK33, Brighray B, Brighray C, Brighray F, Brighray S, Brighray 35, Brighray 36, Nilo (Invar) 42, Nilo (Invar) 48, Nilo (Invar) K, Ferry, Nilomag 77, Ni-Span-C 902, Waspaloy, Udimet L-605, Udimet 188, Udimet 520, Udimet 720, Udimet D-979, Udimet R41, Udimar 250, Udimar 300, Nickel 200, Nickel 201, Duranickel 301, Monel 400, Monel R-405, Monel K-500, Haynes 242, Nickel-based J89/4E18D and J91/7G10XA, etc.

Some examples of ceramic material include alumina AD-998, alumina AD85, boron nitride SBN/50, and boron nitride SBN/30, etc. Some examples of boron nitride material includes BN HC (including BN, CaO and B2O3), BN N-1, BN NB-1000, BN—AlN BA-3, BN—AlN BA-2000, BN—$Si_3N_4$ SBN/70 (includes BN and 70% $Si_3N_4$), BN—$Si_3N_4$ SBN/50 (includes BN and 50% $Si_3N_4$), BN—$Si_3N_4$ SBN/30 (includes BN and 30% $Si_3N_4$), BN UA-2, BN EBN, BN NBSC75 (include BN and SiC), etc.

Some examples of refractory carbide materials include hafnium carbide, tantalum carbide, niobium carbide, zirconium carbide, silicon carbide, boron carbide, titanium carbide, etc.

Another example embodiment is illustrated in FIGS. 2A-2D as schematic views of a mold 200 to form a ceramic 260 having a particular geometry with curve features, with the mold 200 having a first mold portion 220 and a second mold portion 240. The ceramic 260 is molded by applying pressure 280 to the first mold portion 220 and the second mold portion 240 at a temperature greater than 600° C. Each of the first mold portion 220 and the second mold portion 240 has curved mold portions 222 and 242, respectively, to form the ceramic 260 to have curve features 262. Although shown as two-dimensional curved mold portions, the curved mold portions 222 and 242 are not just limited to two-dimensional curvatures, and can therefore be applied as three-dimensional curved surface portions.

According to some embodiments, the first mold portion 220 and the second mold portion 240 can have a similar in CTE value as the ceramic 260 or a difference in CTE values from the ceramic 260 of about 1%, about 2%, about 3%, about 4%, about 5%, about 6%, about 7%, about 8%, about 9%, about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, or about 100%, inclusive of any CTE values therebetween.

According to some embodiments, the first mold portion 220 and the second mold portion 240 can be any of chromium oxide, tantalum oxide and titanium bismuth compound, or any other materials listed as described above with respect to FIGS. 1A-1D and the mold 100, the first mold portion 120 and the second mold portion 140. According to some embodiments, the first mold portion 220 and the second mold portion 240 have high mechanical strength and thermal stability at a temperature greater than 600° C.

In some embodiments, the first mold portion 220 and the second mold portion 240 have a surface coating 230. The surface coating 230 is substantially immiscible with the ceramic 260 at a temperature greater than 600° C. and non-reactive to the first mold portion 220 and the second mold portion 240. According to some embodiments, the surface coating 230 has the same coefficient of thermal expansion as the ceramic 260. According to some embodiments, the surface coating 230 has a difference in CTE values from the ceramic 260 of about 1%, about 2%, about 3%, about 4%, about 5%, about 6%, about 7%, about 8%, about 9%, about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, or about 100%, inclusive of any CTE values therebetween.

The surface coating 230 can be any of chromium oxide, tantalum oxide, boron nitride (BN), nickel boron nitride (Ni—BN), platinum alloys (including PtIr, PtRh, PtAu), titanium boride compound (including $TiB_2$), Yttria ($Y_2O_3$), cubic boron nitride (c-BN), aluminum carbide (AlC), ionbond 22 (AlTiCrN), titanium aluminum nitride (TiAlN), titanium carbonitride (TiCN), chromium nitride (CrN), diamond-like carbon (DLC, ta-C), silicon carbide (SiC), Plansee Sibor ($SiO_2$), hard chrome (Cr), moly ruthenium (Mo—Ru), titanium nitride (TiN), boron carbide (B4C), titanium aluminum alloy, aluminum chromium nitride (AlCrN), nano aluminum titanium nitride (AlTiN), nano aluminum chromium alloy, Canadize, Dynaloy, Goldenedge, Hi-T-Lube, Lectrofluor, Magnadize, Magnagold, Magnamax-HT, MAGnanoSHIELD, Magnaplate 10K, Magnaplate BTC, Magnaplate HCR, Magnaplate HMF, Magnaplate HTR, Magnaplate TNS, Nedox Basic, Nedox, Nedox PF, Plasmadize Basic, Plasmadize, and Tufram, etc.

In some embodiments, the surface coating 230 can include multilayer coatings with alternating layers of two or more materials, including graphite, tool steel, stainless steel, refractory metal and alloys, super alloys and ceramic materials as described herein.

Some example methods of coating for creating the surface coating 230 can include any of physical vapor deposition (PVD), chemical vapor deposition (CVD), spray coating, plasma spray coating, electroplating, electroless plating, etc.

According to some embodiments, the surface coating 230 can have a coating thickness ranging from about 100 nanometers (nm) to about 100 micrometers (μm). In some embodiments, the surface coating 230 can have a coating thickness of about 100 nm, about 200 nm, about 300 nm, about 400 nm, about 500 nm, about 600 nm, about 700 nm, about 800 nm, about 900 nm, about 1 μm, about 2 μm, about 3 μm, about 4 μm, about 5 μm, about 6 μm, about 7 μm, about 8 μm, about 9 μm, about 10 μm, about 12 μm, about 14 μm, about 16 μm, about 18 μm, about 20 μm, about 25 μm, about 30 μm, about 35 μm, about 40 μm, about 45 μm, about 50 μm, about 55 μm, about 60 μm, about 65 μm, about 70 μm, about 75 μm, about 80 μm, about 85 μm, about 90 μm, about 95 μm, about 100 μm, about 110 μm, about 120 μm, about 130 μm, about 140 μm, about 150 μm, about 160 μm, about 170 μm, about 180 μm, about 190 μm, about 200 μm, and inclusive of any values therebetween.

In some embodiments, the first mold portion 220 and the second mold portion 240 may include a passivation layer of about 100 nanometers or less to prevent further oxidation or diffusion to the underlying material and is located between the mold portion and the surface coating. The passivation layer can have a thickness between 10 nanometers and 80 nanometers, including a thickness of about 20 nm, about 30 nm, about 40 nm, about 50 nm, about 60 nm, about 70 nm, and inclusive of any values therebetween.

In some embodiments, the passivation layer can be any of graphite, tool steel, stainless steel, refractory metal and alloys, super alloys, ceramic materials, and any of the coating materials listed with respect to the surface coating 230. Examples of method of creating the passivation layer include physical vapor deposition (PVD), chemical vapor deposition (CVD), spray coating, plasma spray coating, electroplating, electroless plating, etc., and annealing under air or any gas, including oxygen, nitrogen, hydrogen, argon, neon, etc.

Figure 2A:
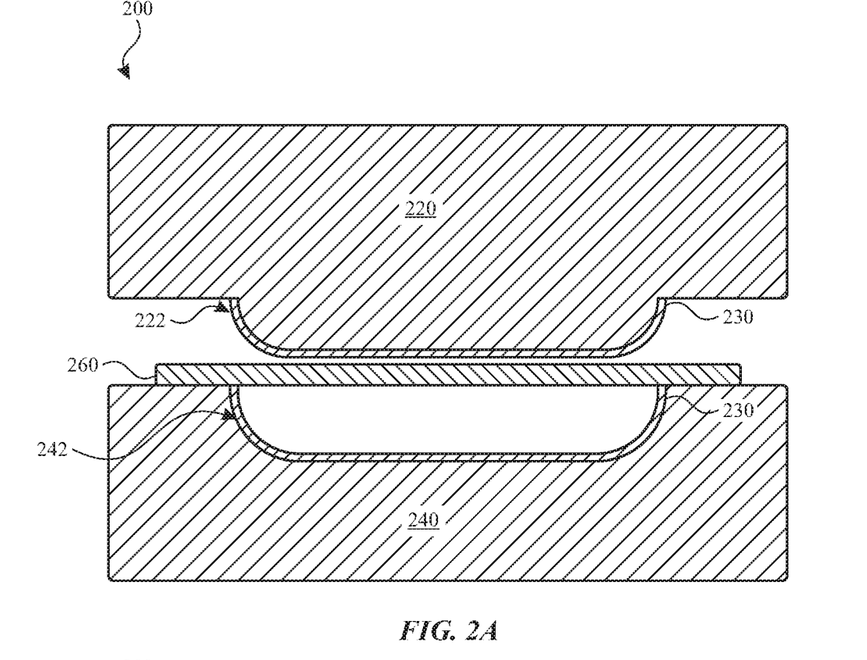
FIGS. 2A-2D illustrate schematic views of a mold having similar mold portions and having a surface coating, according to some embodiments.
Figure 2B:
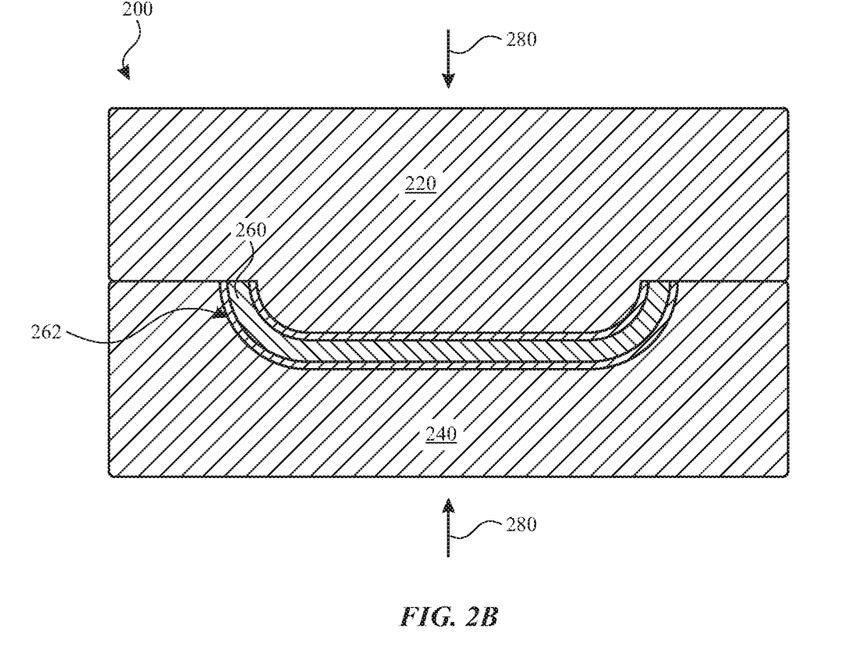
Figure 2C:
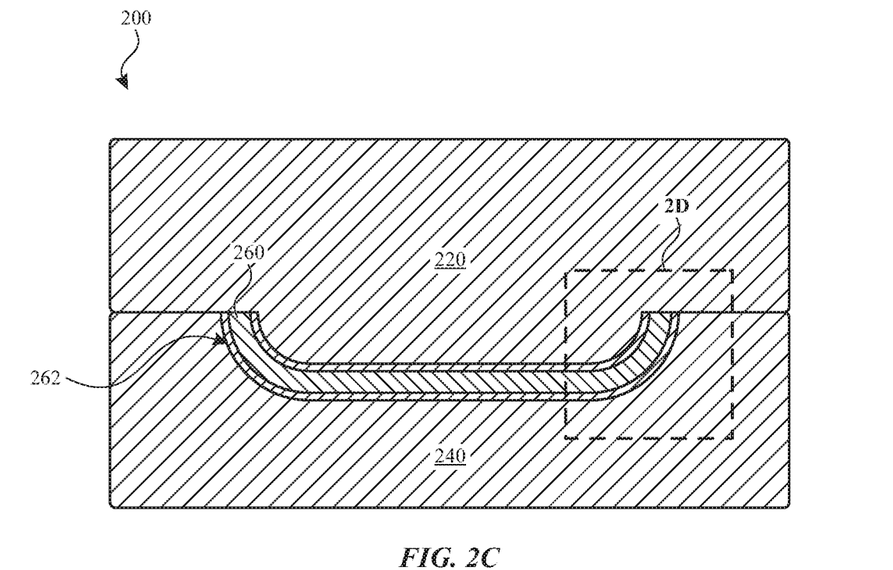
Figure 2D:
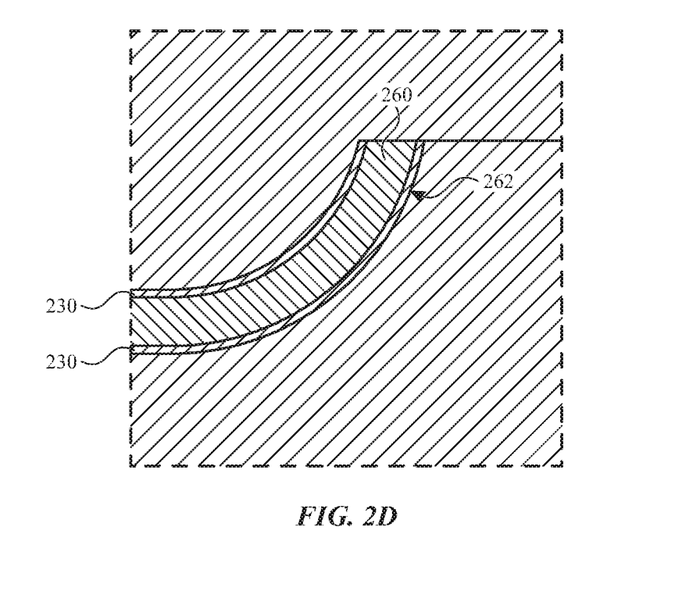
Figure 3A:
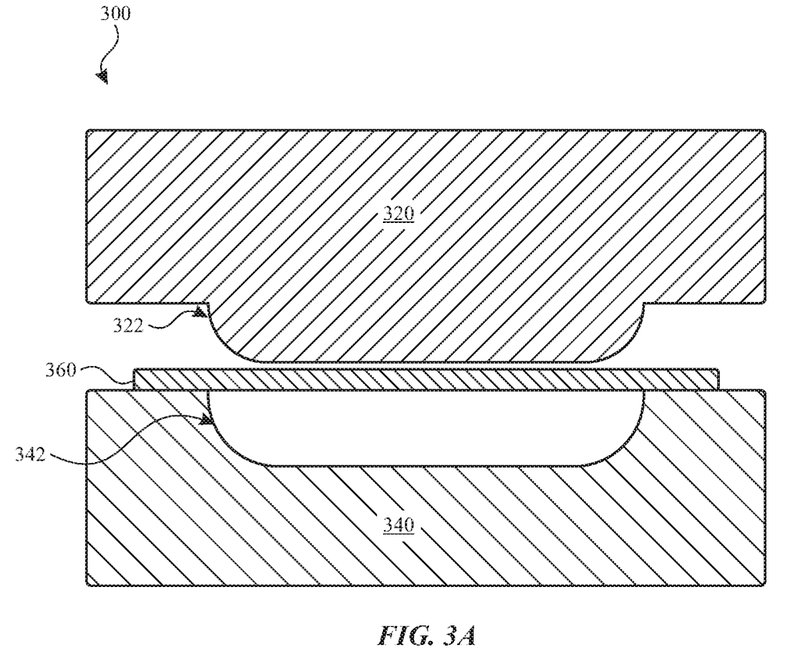
FIGS. 3A-3D illustrate schematic views of a mold having different mold portions, according to some embodiments.
Figure 3B:
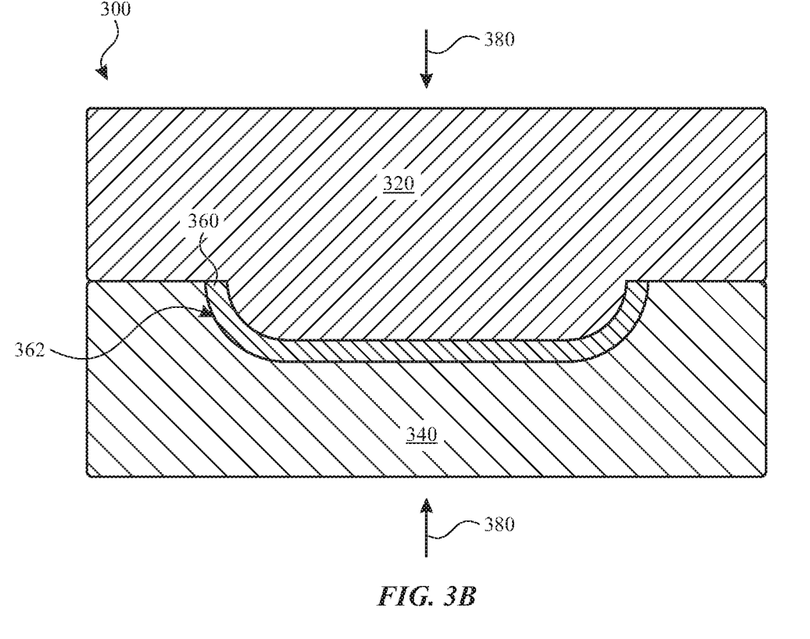
Figure 3C:
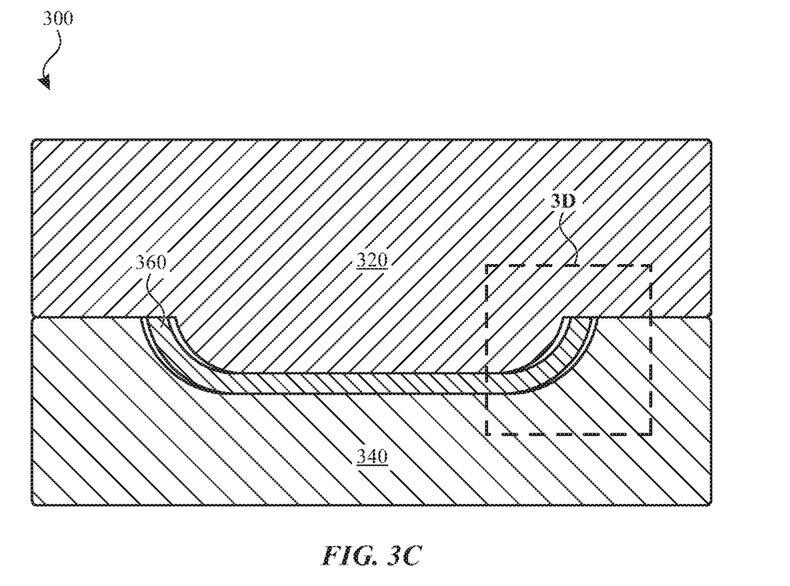

Another example embodiment is illustrated in FIGS. 3A-3C as a schematic view of a mold 300 to form a ceramic 360 having a particular geometry with curve features, with the mold 300 having a first mold portion 320 and a second mold portion 340. Unlike the molds in FIGS. 1A-2D, the first mold portion 320 and the second mold portion 340 are different materials to take advantage of CTE differences between the first mold portion 320, the second mold portion 340, and the ceramic 360. In this example, dissimilar physical characteristics and properties are designed to exploit or minimize ceramic damage and to help with release of the ceramic 360 from the mold 300. For example, using different mold materials for the two mold portions can prevent ceramic cracking and promote release of the ceramic from the mold. According to some embodiments, this technique may be used to create ceramic geometries with sharper angles (e.g., less draft) or curves than conventional molds. According to some embodiments, the first mold portion 320 and the second mold portion 340 are substantially immiscible with the ceramic 360 at a temperature greater than 600° C.

According to some embodiments, the CTE values of the first mold portion 320 and the second mold portion 340 are different from that of the ceramic 260. In some embodiments, the difference in CTE values between the first mold portion 320, the second mold portion 340 and the ceramic 360 can be about 1%, about 2%, about 3%, about 4%, about 5%, about 6%, about 7%, about 8%, about 9%, about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, or about 100%, inclusive of any CTE values therebetween.

As illustrated in FIG. 3B, an applied pressure 380 can be applied to at least one of the first mold portion 320 or the second mold portion 340 so as to move the first mold portion 320 or the second mold portion 340 to compress the ceramic 360. At an elevated temperature greater than 600° C. (referred to herein as a "Hot" state in FIG. 3B) and a pressure of at least 0.1 MPa, the ceramic 360, along with the first mold portion 320 and the second mold portion 340 expand so as to conform the ceramic 360 to the shape of the mold, particularly with respect to curved mold portions 322 and 324 to form the ceramic 360 to have curve features 362.

To mold a material with a complex geometry, such as the ceramic 360 having curve features 362, exploiting physical characteristics and properties of the mold materials can be beneficial in designing to the mold 300 in order to minimize ceramic damage and to help with release of the ceramic 360 from the mold 300. In one example, if the CTE value of the first mold portion 320 is substantially higher than that of the ceramic, the first mold portion 320 can expand greater than the ceramic 360 and thus compress, and thus damage, the ceramic 360 at its curve features 362. On the other hand, if the first mold portion 320 has a slightly higher CTE than the ceramic 360, and the second mold portion 340 has a slightly lower CTE than the ceramic 360, the ceramic 360 can be molded to include its curve features 362 and can be removed from the mold 300 without a damage or defect. According to some embodiments, the slightly higher CTE refers to a CTE value of about 0.1 µm/m/° C. to about 10 µm/m/° C. higher than that of the ceramic 360. According to some embodiments, the slightly lower CTE refers to a CTE value of about 0.1 µm/m/° C. to about 10 µm/m/° C. lower than that of the ceramic 360. In some embodiments, the difference in CTE values of about 0.1 µm/m/° C. to about 10 µm/m/° C. can correspond to about 1% to about 100% of the CTE value of the ceramic 360 being molded.

Figure 3D:
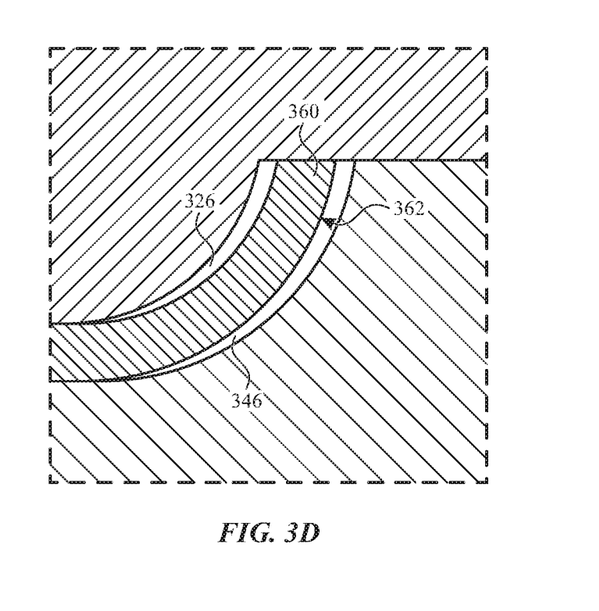

The benefit of using materials with slightly differing CTEs in a suitable arrangement as the first mold portion 320 and the second mold portion 340 is further illustrated in FIG. 3C. Upon cooling down from a temperature greater than 600° C. to a lower temperature (referred to herein as a "Cold" state in FIG. 3C) and a pressure less than 0.1 MPa, the first mold portion 320 and the second mold portion 340, along with the ceramic 360 being molded can shrink according to their respective CTEs. FIGS. 3C and 3D illustrate an example, in which the curve features 362 of the ceramic 360 are shown not to be touching either of the curved mold portion 322 of the first mold portion 320 or the curved mold portion 342 of the second mold portion 340, due to their slightly differing CTEs creating a gap 326 on either or both sides of the ceramic 360. Alternatively, if the first mold portion 320 and the second mold portion 340 have a substantially similar CTE as the ceramic 360, then the ceramic 360 may stick to the first mold portion 320 and the second mold portion 340, particularly at the curved mold portions 322 and 342 during compressing or when releasing the ceramic 360 from the first mold portion 320 and the second mold portion 340. As a result, the ceramic 360 and/or the first mold portion 320 and/or the second mold portion 340 may also sustain damage.

In some embodiments, molds 100, 200, 300, mold portions 120, 140, 220, 240, 320, and 340, can be made from any of the materials listed below. For example, alloys, such as set-up sample (SUS) alloys with high Cr content generally have high coefficient of thermal expansion (CTE), and thus are useful for core (convex) side of the mold. Others, such as bulk Cr and chromium-iron-yttrium (CFY) alloys are particularly well matched to aluminosilicate glass in terms of CTE. Ceramics like titanium di-bismuth ($TiB_2$) have very low CTE and are well suited to the cavity (concave) side of the mold. Majority of oxides, such as $Al_2O_3$, $Fe_2O_3$, $ZrO_2$, $TiO_2$, MgO, etc. form solutions or mixtures with $SiO_2$. This implies that at elevated temperatures, in spite of the mold being in the solid-state, and the glass in a highly viscous liquid state, there is a driving force for reaction between the oxide mold surface and the glass. Therefore, molds that comprise oxide materials that are substantially immiscible with silica-glass can provide immiscible surfaces and interfaces that can reduce or retard the reaction.

In some embodiments, some of the notable immiscible oxides of silica-glass are chromium oxide (Chromia, $Cr_2O_3$) and tantalum oxide ($Ta_xO_y$). These two oxide materials can be fabricated directly into molds using conventional ceramic processing, such as press and sinter to make bulk chromium oxide or tantalum oxide molds. In chromium molds, the molds are fabricated so as to maximize the chromium oxide content at the mold surface. Similarly, the tantalum molds are fabricated so as to maximize the tantalum oxide content at the mold surface.

In some embodiments, immiscible oxides of silica-ceramics, such as chromium oxide and tantalum oxide can also be coated on the molds as a surface coating, as discussed with respect to FIGS. 2A-2D. With regards to coating of these oxide materials, a coating of chromium oxide or tantalum oxide can be produced via using deposition techniques, such as vapor deposition or electroplating. This can also be achieved by depositing either of the chromium or tantalum metal on top of another metal or alloy, and subsequently oxidizing the metal in-situ under partial pressure of oxygen. Regardless, the coatings of the chromium oxide or tantalum oxide can be produced with a range of thicknesses from several nanometers to several tens of micrometers.

Other mold materials, such as SUS and Ni-based super alloys form native oxide surfaces which give them high temperature oxidation-resistant behavior. According to some embodiments, specific alloy compositions can be designed and selected to dramatically improve performance by increasing the chromium content of the alloys to ensure a uniform chromium oxide surface devoid of iron, aluminum, and nickel oxides. Besides alloy composition, specific chemical (i.e., passivation) and heat treatments can also be tailored to increase chromium oxide on the surface prior to mold forming. In some examples, at least 18%, and preferably more than 20% Cr would create a sufficient chromium oxide layer that prevents reaction of the ceramic with the mold.

According to some embodiments, an alternative way to prevent or reduce metal oxide miscibility in silica-glasses utilizes a saturated oxide surface/interface. Most glass materials contain a majority of $SiO_2$ with a number of other oxides including $Al_2O_3$, $Na_2O$, $Li_2O$, etc. For example, while a $SiO_2$ mold in contact with $SiO_2$-glass would possess a thermodynamic driving force to react, certain glass compositions that are near saturation of $SiO_2$ would thus not react with a $SiO_2$ mold.

In addition, chromium metal alloys, such as CFY or bulk chromium can offer the advantage of not only forming an inherent surface (chromium) oxide, but also a self-healing oxide if the oxide surface is damaged. This process is possible since of the bulk of the alloy material is chromium.

Plating of chromium can be enhanced by co-depositing boron nitride (BN) with the Cr metal. Plating offers a number of advantages by reducing cost, using a lower-cost substrate, and incorporating other mold interface materials, such as BN. This layer can also be used as part of a plating stack, or an engineered layer of multiple materials to ensure non-oxidation of the substrate and minimal or no reaction of the mold surface with the ceramic. One example of a low-CTE, high temperature refractory metal, such as tungsten carbide (WC) or titanium zirconium molybdenum (TZM) which normally oxidizes, but can be protected by plated chromium.

Another mold material that has been tested that has survived a high number of cycles is a titanium bismuth compound, such as titanium diboride ($TiB_2$). In the tests, $TiB_2$ appears to oxidize slowly enough under typical ceramic forming temperatures to prevent reaction of any $TiO_x$ surface oxide with the ceramic. This material has added advantages of high strength durability, hardness, and similar coefficient of thermal expansion to ceramic.

It is to be understood that the claims are not limited to the precise configuration and components illustrated above. Various modifications, changes and variations may be made in the arrangement, operation and details of the methods and apparatus described above without departing from the scope of the claims.

Unless otherwise defined, all terms (including technical and scientific terms) are to be given their ordinary and customary meaning to a person of ordinary skill in the art, and are not to be limited to a special or customized meaning unless expressly so defined herein. It should be noted that the use of particular terminology when describing certain features or aspects of the disclosure should not be taken to imply that the terminology is being re-defined herein to be restricted to include any specific characteristics of the features or aspects of the disclosure with which that terminology is associated. Terms and phrases used in this application, and variations thereof, especially in the appended claims, unless otherwise expressly stated, should be construed as open ended as opposed to limiting. As examples of the foregoing, the term 'including' should be read to mean 'including, without limitation,' 'including but not limited to,' or the like; the term 'comprising' as used herein is synonymous with 'including,' 'containing,' or 'characterized by,' and is inclusive or open-ended and does not exclude additional, unrecited elements or method steps; the term 'having' should be interpreted as 'having at least;' the term 'includes' should be interpreted as 'includes but is not limited to;' the term 'example' is used to provide exemplary instances of the item in discussion, not an exhaustive or limiting list thereof; adjectives such as 'known', 'normal', 'standard', and terms of similar meaning should not be construed as limiting the item described to a given time period or to an item available as of a given time, but instead should be read to encompass known, normal, or standard technologies that may be available or known now or at any time in the future; and use of terms like 'preferably,' 'preferred,' 'desired,' or 'desirable,' and words of similar meaning should not be understood as implying that certain features are critical, essential, or even important to the structure or function of the invention, but instead as merely intended to highlight alternative or additional features that may or may not be utilized in a particular embodiment of the invention. Likewise, a group of items linked with the conjunction 'and' should not be read as requiring that each and every one of those items be present in the grouping, but rather should be read as 'and/or' unless expressly stated otherwise. Similarly, a group of items linked with the conjunction 'or' should not be read as requiring mutual exclusivity among that group, but rather should be read as 'and/or' unless expressly stated otherwise.

Where a range of values is provided, it is understood that the upper and lower limit and each intervening value between the upper and lower limit of the range is encompassed within the embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity. The indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention, e.g., as including any combination of the listed items, including single members (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All numbers expressing quantities of ingredients, reaction conditions, and so forth used in the specification are to be understood as being modified in all instances by the term 'about.' Accordingly, unless indicated to the contrary, the numerical parameters set forth herein are approximations that may vary depending upon the desired properties sought to be obtained. At the very least, and not as an attempt to limit the application of the doctrine of equivalents to the scope of any claims in any application claiming priority to the present application, each numerical parameter should be construed in light of the number of significant digits and ordinary rounding approaches.

All references cited herein are incorporated herein by reference in their entirety. To the extent publications and patents or patent applications incorporated by reference contradict the disclosure contained in the specification, the specification is intended to supersede and/or take precedence over any such contradictory material.

Headings are included herein for reference and to aid in locating various sections. These headings are not intended to limit the scope of the concepts described with respect thereto. Such concepts may have applicability throughout the entire specification.

Furthermore, although the foregoing has been described in some detail by way of illustrations and examples for purposes of clarity and understanding, it is apparent to those skilled in the art that certain changes and modifications may be practiced. Therefore, the description and examples should not be construed as limiting the scope of the invention to the specific embodiments and examples described herein, but rather to also cover all modification and alternatives coming with the true scope and spirit of the invention.

The invention claimed is:

1. A mold apparatus, comprising:
a first mold portion and a second mold portion configured to receive a ceramic material for molding, the first mold portion and the second mold portion being substantially immiscible with the ceramic material at a temperature greater than 600° C., wherein the first mold portion and the second mold portion have a similar coefficient of thermal expansion as the ceramic material;
a surface coating on the first mold portion, wherein the surface coating is of an oxide of a silica-ceramic; and
a passivation layer between the first mold portion and the surface coating, wherein the passivation layer is configured to prevent oxidation and diffusion at an interface between the first mold portion and the ceramic material, wherein the passivation layer is of a material selected from the group consisting of graphite, tool steel, and stainless steel.

2. The mold apparatus of claim 1, wherein at least one of the first mold portion and the second mold portion is any of chromium oxide, tantalum oxide or titanium bismuth compound.

3. The mold apparatus of claim 1, wherein at least one of the first mold portion and the second mold portion is a chromium oxide having at least 18 atomic percent of chromium.

4. The mold apparatus of claim 1, wherein the surface coating is of any of chromium oxide, tantalum oxide or titanium bismuth compound.

5. The mold apparatus of claim 4, wherein the surface coating has a thickness from about 100 nanometers to 100 micrometers.

6. The mold apparatus of claim 1, wherein the passivation layer has a thickness of about 100 nanometers or less.

7. The mold apparatus of claim 6, wherein the surface coating is of one of chromium oxide, tantalum oxide or titanium bismuth compound.

8. The mold apparatus of claim 1, wherein:
the surface coating is a first surface coating;
the passivation layer is a first passivation layer;
the mold apparatus further comprises:
a second surface coating on the second mold portion; and
a second passivation layer between the second mold portion and the second surface coating, wherein the passivation layer is configured to prevent oxidation and diffusion at an additional interface between the second mold portion and the ceramic material.

9. A mold apparatus, comprising:
a mold configured to receive a ceramic material having a coefficient of thermal expansion, the mold having a surface coating and a passivation layer disposed between the mold and the surface coating and being configured to prevent diffusion to the mold, the passivation layer having a thickness between 10 nanometers and 80 nanometers,
wherein the surface coating is substantially immiscible with the ceramic material at a temperature greater than 600° C. and wherein the mold and the surface coating have a similar coefficient of thermal expansion as the ceramic material.

10. The mold apparatus of claim 9, wherein the passivation layer has a thickness less than the surface coating.

11. The mold apparatus of claim 9, wherein the mold is one of chromium oxide, tantalum oxide or titanium bismuth compound.

12. A mold apparatus, comprising:
a first mold portion having a first coefficient of thermal expansion at a temperature greater than 600° C.;
a surface coating on the first mold portion, wherein the surface coating is of an oxide of a silica-ceramic;
a passivation layer disposed between the first mold portion and the surface coating and being configured to prevent oxidation at an interface between the first mold portion and a ceramic material, wherein the passivation layer is of a material selected from the group consisting of graphite, tool steel, and stainless steel; and
a second mold portion having a second coefficient of thermal expansion, wherein the first coefficient of thermal expansion is different than the second coefficient of thermal expansion.

13. The mold apparatus of claim 12, wherein at least one of the first mold portion or the second mold portion is any of chromium oxide, tantalum oxide or titanium bismuth compound.

14. The mold apparatus of claim 12, wherein at least one of the first mold portion or the second mold portion is a chromium oxide having at least 18 atomic percent of chromium.

15. The mold apparatus of claim 12, wherein the first mold portion and the second mold portion comprise different materials.

16. The mold apparatus of claim 12, wherein the first coefficient of thermal expansion is at least 10% greater than the second coefficient of thermal expansion.

17. The mold apparatus of claim 12, wherein the first mold portion and the second mold portion are configured to receive the ceramic material to be molded, the ceramic material having a third coefficient of thermal expansion, wherein the first coefficient of thermal expansion is at least 5% greater than the third coefficient of thermal expansion.

* * * * *